United States Patent [19]
Simonelli

[11] 3,983,594
[45] Oct. 5, 1976

[54] BALL CATCHER AND LAUNCHER FOR A PIPELINE

[76] Inventor: Carlo Simonelli, 2916 Oakmoor Drive, SW., Calgary, Alberta, Canada

[22] Filed: Jan. 9, 1974

[21] Appl. No.: 431,985

[30] Foreign Application Priority Data
Jan. 12, 1973  Canada ............................. 161107

[52] U.S. Cl. ......................... 15/104.06 A; 137/268; 251/310
[51] Int. Cl.² ..................... F16K 25/00; A63B 47/04
[58] Field of Search ............... 138/89, 91, 94, 94.3, 138/103; 137/268; 251/309, 310, 311; 15/104.06 A

[56] References Cited
UNITED STATES PATENTS

| | | | |
|---|---|---|---|
| 1,495,516 | 4/1923 | Hobart | 251/309 X |
| 2,786,219 | 3/1957 | Meyer | 15/104.06 A |
| 3,063,080 | 11/1962 | Bergman et al. | 137/268 X |
| 3,100,308 | 8/1963 | De Sena | 15/104.06 A |
| 3,177,513 | 4/1965 | Ellett | 137/268 |
| 3,226,080 | 12/1965 | Lowrey | 251/309 |
| 3,265,083 | 8/1966 | Sachnik | 15/104.06 A |
| 3,516,638 | 6/1970 | Piggott | 251/310 X |
| 3,605,790 | 9/1971 | Hunter | 137/268 |
| 3,780,985 | 12/1973 | Perry | 251/309 |
| 3,893,469 | 7/1975 | Baker | 251/309 |

FOREIGN PATENTS OR APPLICATIONS

| | | | |
|---|---|---|---|
| 90,205 | 1/1897 | Germany | 251/309 |
| 28,866 | 8/1932 | Netherlands | 15/104.06 A |

*Primary Examiner*—Richard E. Aegerter
*Assistant Examiner*—James E. Bryant, III
*Attorney, Agent, or Firm*—Cox, Smith, Smith, Hale & Guenther Incorporated

[57] ABSTRACT

This invention describes an improved plug type sphere launching and receiving device for pipeline. It involves a housing with a longitudinal passage for the spheres. There is a cylindrical boring perpendicular to the longitudinal channel and a cylindrical plug is inserted into this boring. There is a channel through the plug coaxial with the main channel of the housing and there is a bored opening along the axis of the plug so that a sphere can be inserted into the line from the bottom end of the plug. The housing has a downward extension in line with this opening in the plug so that spaces provided for one or more spheres to be received as they travel down the pipeline to the housing and into the plug. The bottom end of this extension is closed with a screw type sealed closure. Means are provided in the housing surrounding the central passage to seal tightly against the surface of the plug. The plug itself is not exactly cylindrical. Each half of the circumference is turned from a center or rotation which is displaced from the central axis of the plug so that by rotating the plug 90° its effective radius against the seals is increased by the amount of the eccentricity. This provides a strong positive seal when the valve is closed. When the valve is open a perfect seal is not required.

5 Claims, 9 Drawing Figures

U.S. Patent    Oct. 5, 1976    Sheet 1 of 3    3,983,594
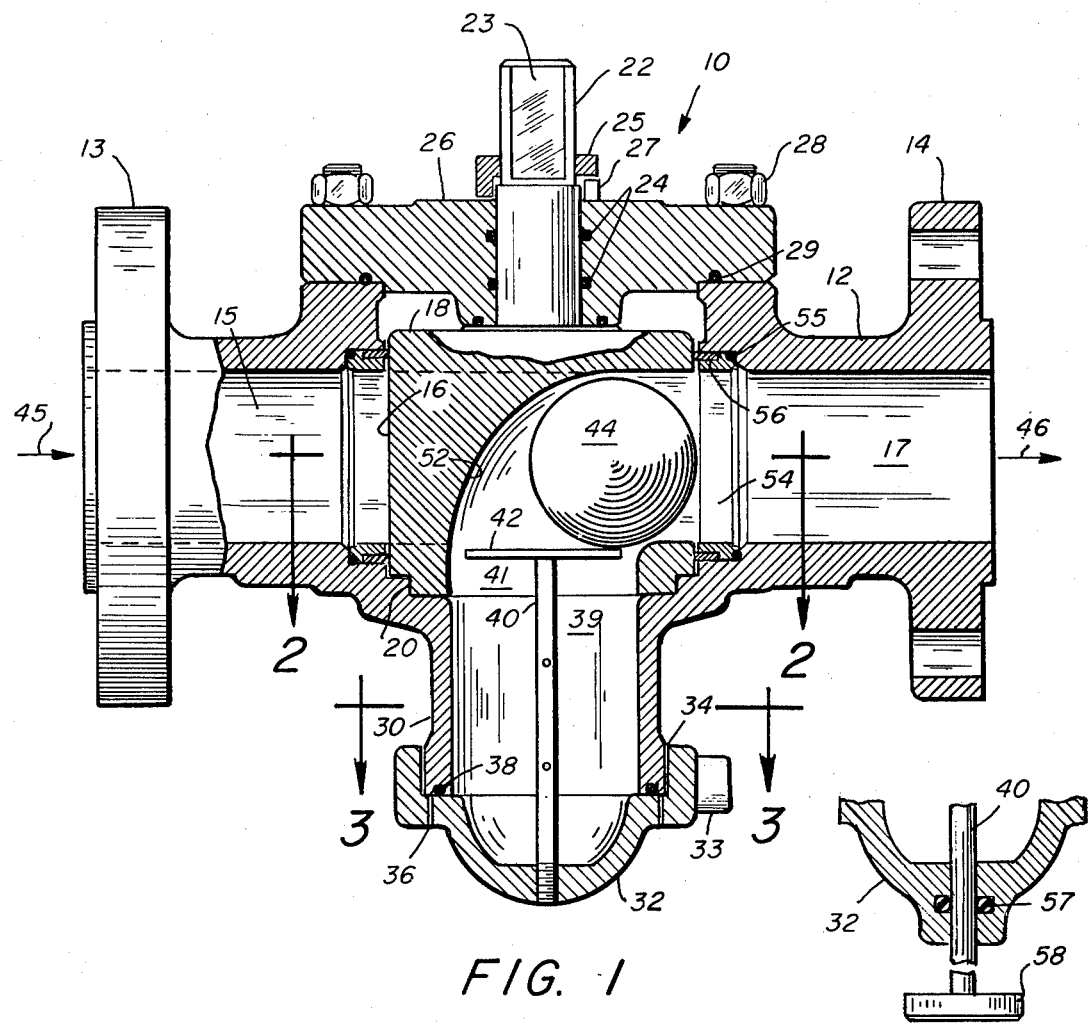
FIG. 1
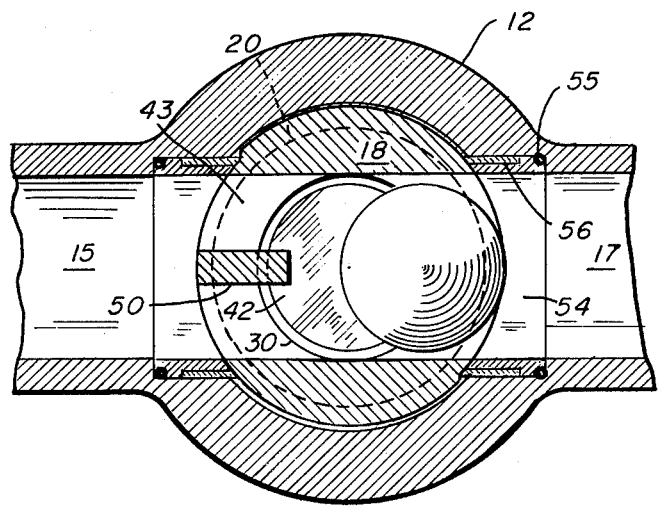
FIG. 2
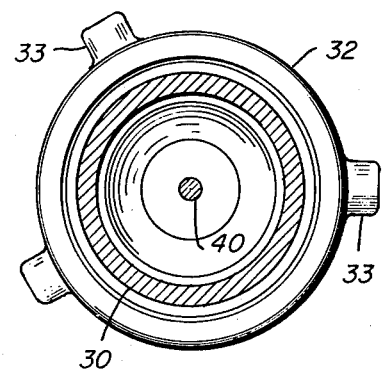
FIG. 1A
FIG. 3

BALL CATCHER AND LAUNCHER FOR A PIPELINE

BACKGROUND OF THE INVENTION

This invention is in the field of pipelines and in the use of spheres to separate batches of liquid in the pipeline.

More particularly it is concerned with devices for launching spheres into the pipeline and for receiving spheres from the pipelines.

Still more particularly it is concerned with means for improving the seal between the rotating plugging element of the device and the seal rings within the housing.

Many devices have been proposed in the prior art for launching and receiving spheres in a pipeline. Most of these utilize a plug type valve arrangement in which the plug can be rotated to close off the pipeline or to provide a passage from the pipeline into the plug and through the plug in a direction transverse to the pipeline to a catching tube or the like. All of such prior art devices are weak in the matter of the sealing between the housing and the surface of the plug.

SUMMARY OF THE INVENTION

It is a primary object to provide a valve type sphere launcher and receiver of the plug type with more perfect sealing between the housing and the surface of the plug. This and other objects are realized and the limitations of the prior art are overcome in this invention by providing a plug which is inserted into the housing and has a passage which is coaxial with the passage through the housing. Means are provided for inserting a sphere into the passage along the axis of the plug which is perpendicular to the axial passage of the housing.

More importantly, the plug instead of having a true cylindrical surface is bored for half of its circumference from an axis of rotation which is displaced from the two axis of the plug by a selected distance or eccentricity. Thus as the plug is rotated to an angle of 90° its effective radius increases by the amount of the eccentricity and therefore provides a more positive pressure against the sealing surfaces. The two semicylinders which form the plug are similar so that both openings of the housing which have seals pressing against the surface of the plug are improved by this eccentricity of the surface so that when the valve is closed both openings of the housing are completely sealed by the plug.

BRIEF DESCRIPTION OF THE DRAWINGS

These and other objects of this invention and a better understanding of the details of the invention will be evident from the following description taken in conjunction with the appended drawings, in which:

FIGS. 1, 1A, 2 and 3 show use of a launcher embodiment of this invention.

DESCRIPTION OF THE PREFERRED EMBODIMENTS

Figure 4:
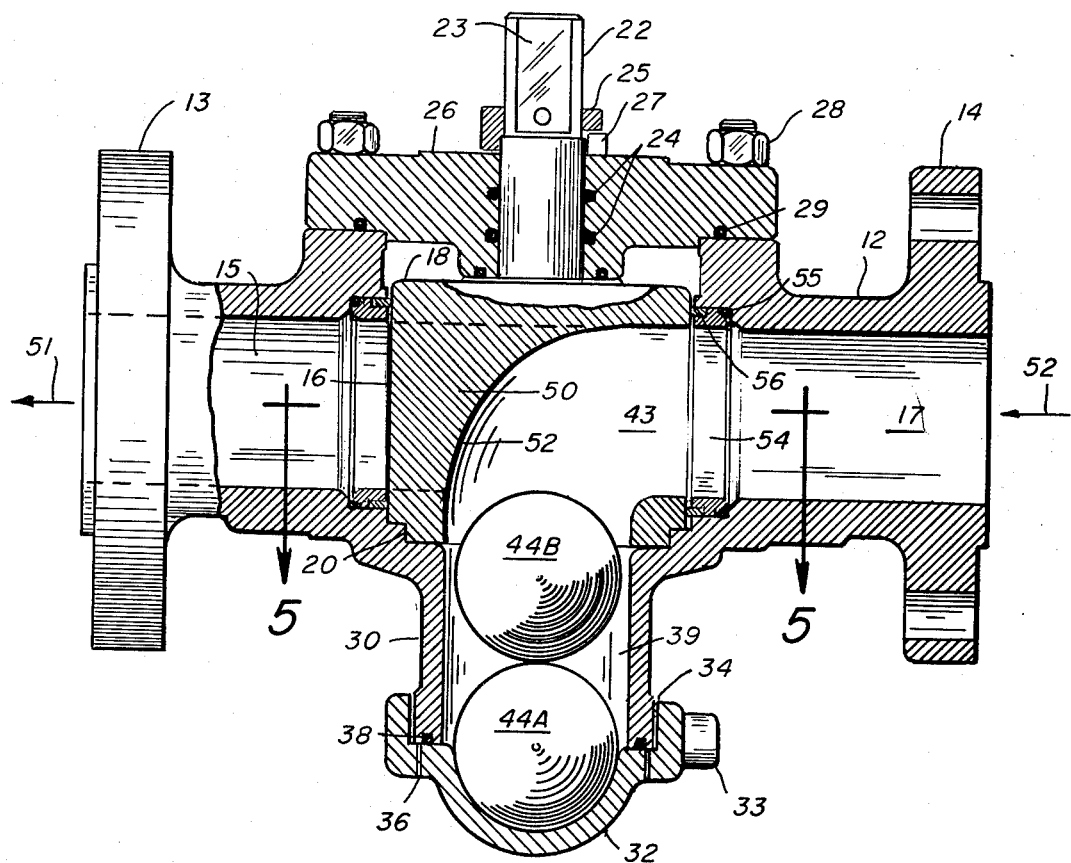
FIGS. 4, 5A and 5B show use of a sphere or ball receiver embodiment of this invention.

Referring now to the drawings and particularly to FIGS. 1, 1A, 2 and 3, the sphere of ball launcher and receiver both indicated in general by the numeral 10, is shown in vertical cross section in FIG. 1. This involves a housing 12 having two neck portions with means such as flanges 13 and 14 for connecting the device end of the pipeline. There is a central longitudinal passageway of a diameter which is slightly larger than the diameter of the spheres or which is substantially the same diameter as that of the balls or spheres which are to be utilized in the pipeline. There are two portions of this central passageway indicated by the numerals 15 at one end and 17 at the other end. There is a cylindrically bored portion of the housing, the axis of the bore is at right angles to the passageway 15, 17. There is a plug 18 inserted to this bored out portion. The cylinder 18 has a shaft extension 22 which in general will have a cylindrical portion which can be sealed by means 24 inside of a cover plate 26 which closes off the top of the bore in the housing. This cover plate 26 is held down by nuts 28. The end of the shaft 22 is cut in the form of a square so that wrenches or other means can be provided for rotating the plug by turning the shaft 22. There is provided a bearing for the other end of the plug opposite to that of the shaft at the point 20 inside the housing. This is a large diameter bearing so that an opening 41 can be provided in the bottom of the plug, that is, at the end of the plug opposite to the shaft end. This opening 41 is large enough for spheres to pass through. There is a horizontal cylindrical opening 43 through the plug which is of the same diameter and coaxial with the passages 15 and 17 in the housing so that when the plug is turned in one direction there will be a passageway for fluid through the plug into the pipeline. There is a bar or rib 50 placed across this opening through the plug to prevent the passage of a ball completely through the plug. This bar can conveniently be curved substantially in the form of a circle 52 so that by lifting a sphere 44 through the opening 41 it will be directed by the surface 52 into the main channel 17 of the housing so that the fluid flow in the direction of the arrow 45 and 46 a ball can be launched into the passageway 17 and into the pipeline by lifting the ball 44 by means of a platform 42 up into this passageway.

There is a downward tubular extension 30 of the housing directly below the opening 41 in the plug. This extension is closed by means of a cap 32 which is locked by threads 34 to the extension 30. Lugs such as 33 are provided around the periphery for tightening the cap 32 on the extension 30. Seal means 38 provide a pressure seal and small drilled opening 36 may be provided to leak the pressure fluid from the space inside of the extension 30 in anticipation of removing the cap 32.

Figure 5A:
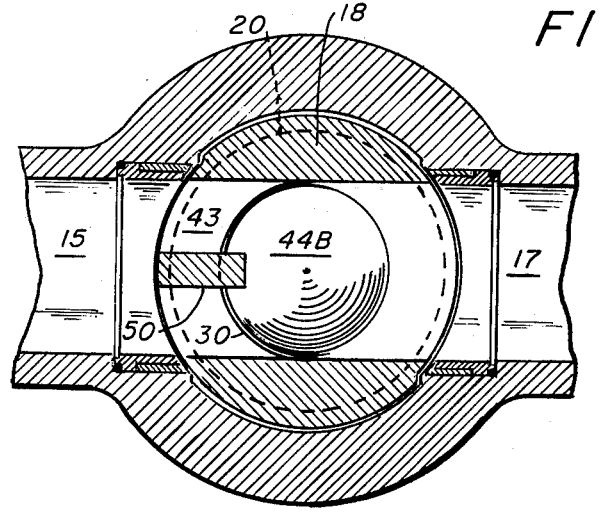
Figure 5B:
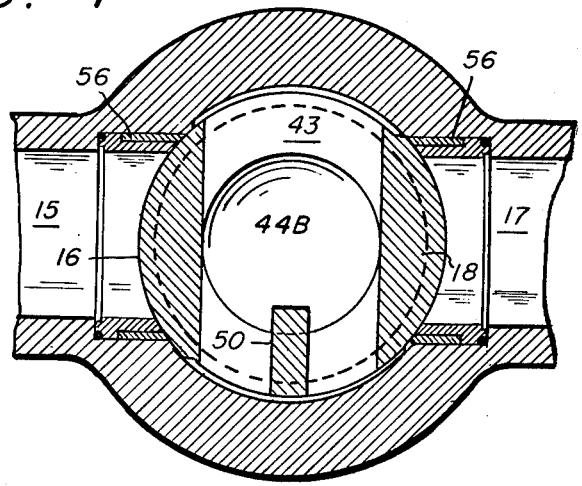

As is indicated in FIG. 5B the plug 18 can be rotated 90° in which case the passage 43 is now perpendicular to the passage 15, 17 and the passages 15 and 17 are sealed by rings 54 and seals 56 inserted into the passageways 15 and 17 with the seals 56 bearing against the cylindrical surface of the plug. Thus by turning the plug 90° the passageway 43 is completely sealed from the pipeline. In this case the cap 32 can be removed and the liquid drained out of the space 39. The platform 42 is supported on a rod 40 which may be threaded into the cap 32. If a sphere such as 44 is to be launched into the channel 17 the sphere is inserted into the space 39, the platform placed beneath the sphere and the sphere lifted up into the position shown in FIG. 1 and the cap 32 screwed tight and sealed. The sphere 44 is now in position to be launched by the fluid flow shown by arrows 45. Of course at the moment since the plug is turned against the flow and sealed against the flow the sphere will remain within the plug contour. Now by rotating the plug 90° to the position shown in FIG. 1, the fluid flow 45 will cause the ball 44 to be pushed along through the passage 17 and into the pipeline.

If it is desired the rod 40 which supports the platform 42 can be made vertically movable and sealed through the bottom by means 57 through the bottom of the cap 32. A handle such as 58 is provided or motor driven means can be provided for lifting the platform 42 to center the ball and the channel 43 and cause it to be inserted into the pipeline.

Figure 6A:
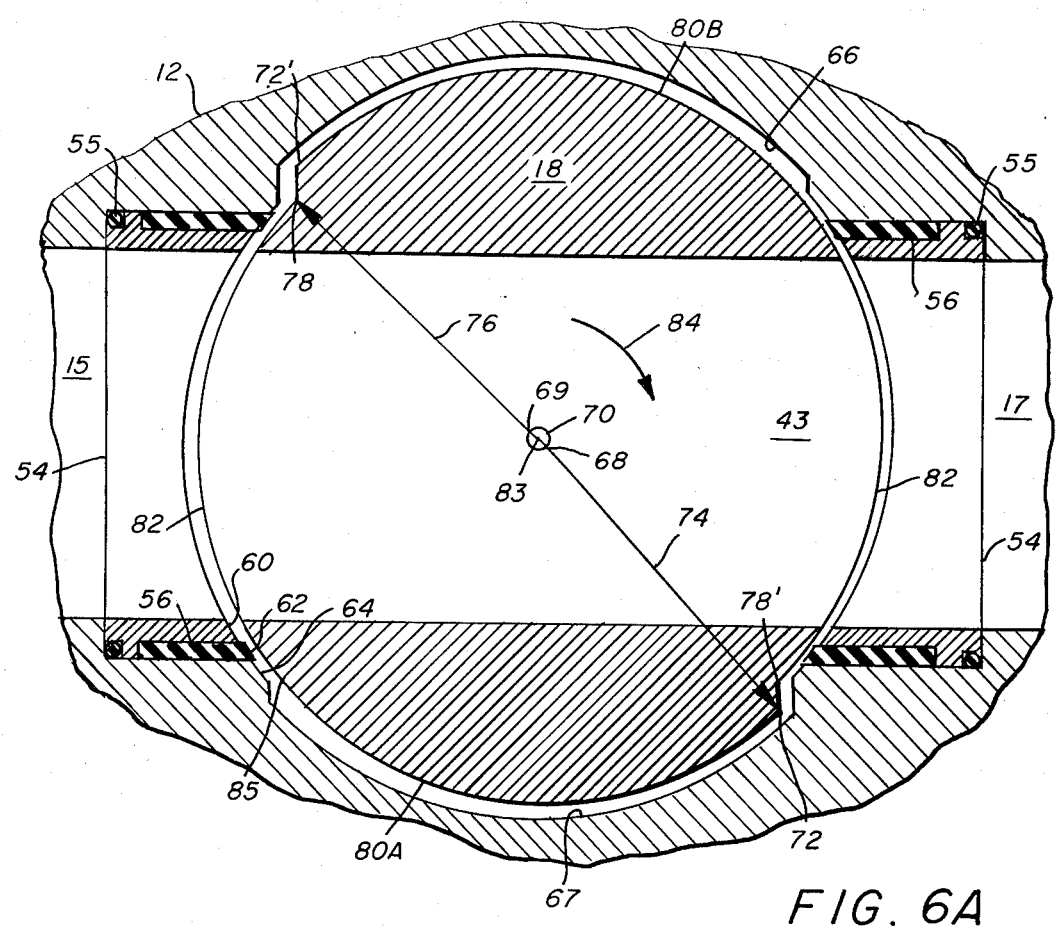
FIGS. 6A and 6B illustrate the principle of the eccentricity of the plug to provide improved sealing between the plug and the housing.
Figure 6B:
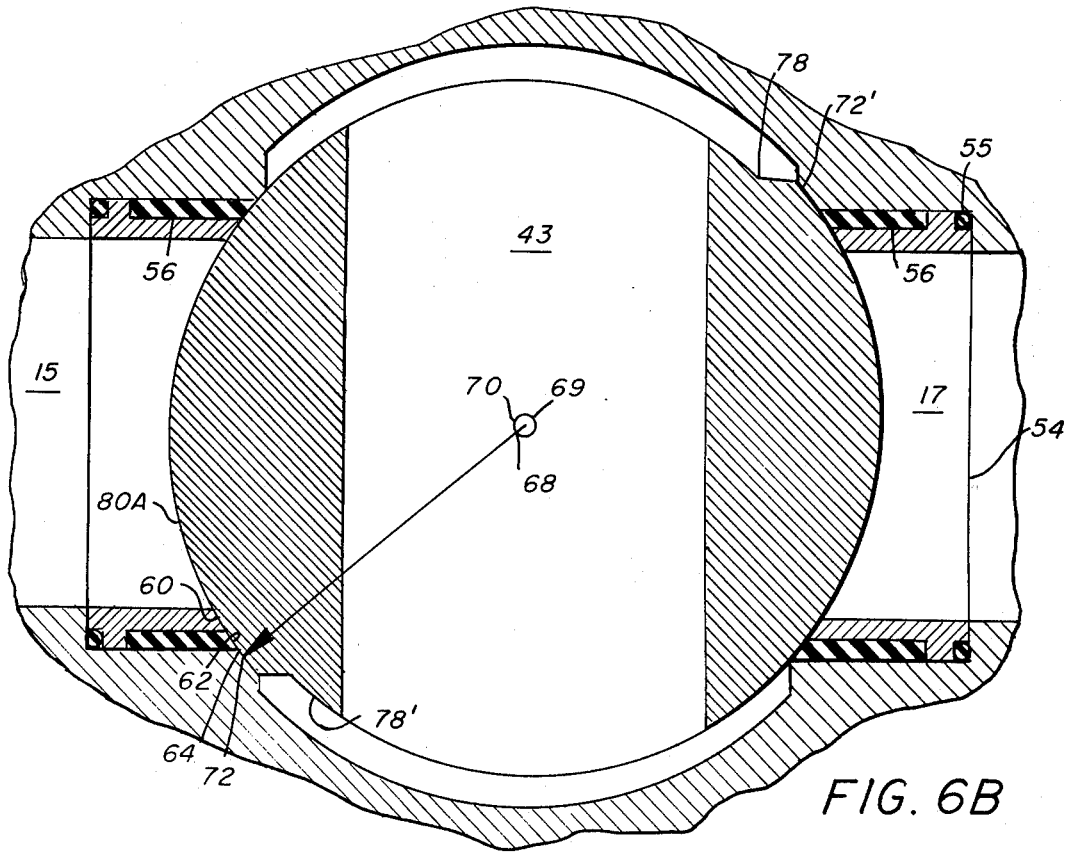

Further details of the rings 54 and seals 56 will be provided in connection with FIGS. 6A and 6B.

Reviewing the process of inserting a sphere into the pipeline the plug 18 is turned until the channel 43 is at right angles to the channels 15 and 17 whereby the seals 56 will completely seal off the channels 15 and 17 from the cavity inside of the plug. When there is no communication between the space 39 and the channels 15, 17, and cap 32 can be removed and with it the support 40 and platform 42. A sphere such as 44 is then inserted in the bottom of the space 39, the platform positioned to raise the sphere and the cap screwed into position, locked and sealed. Then the plug is rotated so that the channel 43 is coaxial with the channel 17 and the fluid flow 45 will then carry the sphere into the pipeline. FIGS. 2 and 3 show additional details by horizontal cross sections along lines 2—2 and 3—3 which are self-explanatory.

Referring now to FIGS. 4, 5A and 5B, there is shown a ball receiver version of this device which is essentially the same as the launcher except that it does not have the platform 42 and support 40.

The ball receiver would normally be placed in the pipeline with the flow of fluid directed in the opposite direction, namely in accordance with the arrows 51 and 52. Thus a sphere coming in from the right through passage 17 goes into the transverse opening 43 of the plug and is directed by the curved edge 52 of the bar 50 down into the space 39 in the extension 30 of the housing. The length of this extension 30 can be of any desired size so that one or a plurality of balls may be accepted before it becomes necessary to turn the plug 90° to seal off the internal cavity of the plug, remove the cap 32, and remove the balls or spheres.

In FIG. 5B it is the device shown with the plug turned 90° so that the passage 43 is now directed perpendicular to the passage 17. In this position the seals 56 inserted into the passages 15 and 17 bear against the surface 16 of the plug 18 to completely seal the internal volume of the plug. In order for the seals to have sufficient area of contact it is clear that the diameter of the opening 43 must be less than a specified fraction of the diameter of the plug surface 16. However, this is well known in the valve art and needs no further discussion.

Reference will now be made to FIGS. 6A and 6B which in a sense are an enlargement of the portions of FIGS. 5A and 5B. The purpose of these FIGS. 6A and 6B are to illustrate the cam type of surface of varying radius which is provided to make a strong and perfect seal between the surface of the plug and the seal rings.

In FIG. 6A is shown a cross section perpendicular to the axis of the plug 18 showing the passageway 43 in alignment with the passages 15 and 17 in the housing. The effects in this view and in FIG. 6B are exaggerated for purposes of illustration. There is a working circle 70 illustrated with its center along the axis of the plug. Its diameter is twice the intended eccentricity of the cams which will be provided to seal the plug. In the passages 15 and 17 are seal rings 54 which are sealed into the housing by O-rings 55 and which house seals 56. The seals 56 are of compliant material and will normally extend beyond the internal surface of the bore in the housing. That is, 62 is projected above the surface of the ring at 60 and the housing at 64.

The circumferential surface of the plug is really machined in two parts. There is one semicylindrical surface 80A and another semicylindrical surface 80B, each of which are identical. The portion 80A extends from point 78 around to point 72. In this portion of a surface is a true cylinder with its center at point 68 which is on the surface of the circle 70 on a diameter which lies in a plane passing between points 78 and 72 and passing through the center 83 of the circle 70. The point 83 is the true axis of the plug. The radius from point 68 to points 78 and to 72 is equal. The radius from the axis 83 to point 72 is larger than the radius 76 from point 83 to point 78 by twice the eccentricity, that is, by the diameter of the circle 70. So while point 78 may be out of contact with the seal 56 when the plug is rotated in accordance with the arrow 84 point 72 now approaches the points 60, 62 and 64, since the radius of the plug is greater pressure can then be brought to bear against the seal so that there is sealing contact between the surface 80A at point 64 on the housing, 62 on the seal and 60 on the seal ring. By referring to FIGS. 1 or 4, it is clear that when the passage 43 is aligned with the passages 15 and 17 a perfect seal between the seals 56 and the plug is not required since the entire space inside the plug and inside the space 39 is completely sealed by the cover plate 26 and the bottom cover 32. However, when it is desired to open the space 39 through the atmosphere the space 39 must be completely sealed from the channels 15 and 17 so that the seals 56 must make perfect contact with the surfaces 80A and 80B. The means of accomplishing this seal is by making quadrant between point 72 and 85 of larger radius than the quadrant between point 85 and 78 so that by turning the plug 90° the surface of the plug is in a sense pushed outward by an amount corresponding to the eccentricity and creating any desired pressure against the seals 56. Since the two halves of the plug are machined in the same way, both seals are effectively pressed against the surface of the plug in the position shown in FIG. 6B and therefore completely seal the inner space of the plug. The housing inner surface is enlarged at 66 and oppositely at 67 to permit the enlarged portions or cam surfaces of the plug to be received therein when the plug is rotated 90° from the closed position shown in FIG. 6B to the open position shown in FIG. 6A.

While the invention has been described with a certain degree of particularly, it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed:
1. A ball handling device insertable into a fluid pipeline comprising:

a. a housing having an inlet and outlet on opposing sides of said housing being adapted for connection to a pipeline, a first cylindrical passageway therethrough in longitudinal alignment with and connecting to said inlet and said outlet, said first cylindrical passageway having a diameter at least as large as that of the inlet, a chamber within the housing forming a part of said first cylindrical passageway and being larger than the diameter of the first cylindrical passageway;

b. a first cylindrical bore in the housing extending traversely to said first cylindrical passageway and in communication therewith, said first cylindrical bore having a diameter at least as large as that of the said cylindrical passageway;

c. plug means pivotally disposed with the chamber and having an outer surface larger than the diameter of the first cylindrical passageway, a second cylindrical passageway provided through the plug means and pivotally alignable and communicating with the first cylindrical passageway which allows flow of a fluid through said device, a second cylindrical bore in said plug means traversely disposed with respect to the said second cylindrical passageway and in continuous communication therewith for all pivotable positions of said plug means and in continuous communication with the first cylindrical bore, sealing means carried by the housing which closes said first cylindrical passageway when the plug means is pivoted so that the second cylindrical passageway is disposed transversely with respect to the first cylindrical passageway;

d. a guide bar having a concave arcuate surface secured to the plug means within said second cylindrical passageway which diverts a ball received within the device out of the first cylindrical passageway and into the first cylindrical bore when fluid flow is in one direction through the pipeline and which directs a ball out of the first cylindrical bore and into the first cylindrical passageway when fluid flow in the pipeline is in the opposite direction without interruption of fluid flow;

e. removable closure means which closes said first cylindrical bore.

2. A ball handling device as set forth in claim 1 and including movable platform means carried by the closure means and extendable into the second cylindrical bore for moving a ball into the cylindrical passageways for insertion into the pipeline.

3. A ball handling device as set forth in claim 1 wherein the sealing means comprises a valve seat at each end of the chamber around the first cylindrical passageway, an operator shaft rotatably carried by the housing and attached to the plug means for rotation of the plug means through 90° for moving the outer surface of the plug means into contact with the valve seats.

4. A ball handling device as set forth in claim 3 wherein the valve seat comprises a pair of oppositely disposed annular cavities at each end of the chamber within the first cylindrical passageway adjacent the plug means, metal rings inserted into said cavities adjacent said plug means, rings of compliant sealing material inserted into each said cavity between said metal ring and the housing.

5. A ball handling device as set forth in claim 3 wherein the outer surface of said plug means comprises two camming outer surfaces on opposite sides of said plug means so that when said plug means is rotated into contact with the valve seats an outwardly directed force is exerted against said valve seats by said camming outer surfaces.

* * * * *